(12) United States Patent
Chou et al.

(10) Patent No.: US 10,260,819 B2
(45) Date of Patent: Apr. 16, 2019

(54) THERMOSIPHONS FOR USE WITH TEMPERATURE-REGULATED STORAGE DEVICES

(71) Applicant: Tokitae LLC, Bellevue, WA (US)

(72) Inventors: Fong-Li Chou, Bellevue, WA (US); Fridrik Larusson, Seattle, WA (US); Brian L. Pal, Medina, WA (US); Nels R. Peterson, Bellevue, WA (US); Lowell L. Wood, Jr., Bellevue, WA (US)

(73) Assignee: Tokitae LLC, Bellevue, WA (US)

( * ) Notice: Subject to any disclaimer, the term of this patent is extended or adjusted under 35 U.S.C. 154(b) by 127 days.

(21) Appl. No.: 15/219,592

(22) Filed: Jul. 26, 2016

(65) Prior Publication Data
US 2018/0031327 A1    Feb. 1, 2018

(51) Int. Cl.
*F28F 3/14*    (2006.01)
*F25B 21/04*    (2006.01)
(Continued)

(52) U.S. Cl.
CPC ............ *F28D 15/025* (2013.01); *F25B 21/04* (2013.01); *F25B 23/006* (2013.01); *F25D 19/00* (2013.01); *F28D 15/0258* (2013.01); *F28D 15/0266* (2013.01); *F28D 15/06* (2013.01); *F28D 20/00* (2013.01); *F28F 3/14* (2013.01); *F25B 2321/021* (2013.01); *F25B 2321/0252* (2013.01); *F28D 2015/0216* (2013.01); *F28F 2210/02* (2013.01); *Y02E 60/142* (2013.01)

(58) Field of Classification Search
CPC . F28D 1/02; F28D 20/00; F28D 19/00; F25B 23/006; F25B 21/04; F25B 2321/0252; F28F 3/14; F28F 2210/02
See application file for complete search history.

(56) References Cited

U.S. PATENT DOCUMENTS

| | | | | |
|---|---|---|---|---|
| 1,769,017 A | * | 7/1930 | Davenport | F25B 9/006 62/83 |
| 3,782,134 A | * | 1/1974 | Meess | F25B 15/10 62/476 |

(Continued)

OTHER PUBLICATIONS

National News; A Newsletter from National Refrigerants, Inc.; "Non-Condensable Gas in Refrigerant"; National News Summer 2011; pp. 1-4.

*Primary Examiner* — Kun Kai Ma

(57) ABSTRACT

In some embodiments, a thermosiphon configured for use within a temperature-regulated storage device includes: a condenser region, including a plurality of evenly spaced condenser channels with horizontally symmetrical bifurcated branches connected to an adiabatic channel, each of the plurality of condenser channels connected at a top position to an upper channel; an evaporator region, including a plurality of evaporator channels, wherein each of the plurality of evaporator channels has a flow channel formed in a serpentine channel pattern and each subunit of the serpentine channel pattern is attached to a vapor return channel at a top of the subunit, and wherein the evaporator region has at least one lowest position connected directly to a vapor return channel; and an adiabatic region including at least one adiabatic channel connecting the evaporator channels and the condenser channels.

40 Claims, 8 Drawing Sheets

(51) Int. Cl.
*F25B 23/00* (2006.01)
*F25D 19/00* (2006.01)
*F28D 15/02* (2006.01)
*F28D 15/06* (2006.01)
*F28D 20/00* (2006.01)

(56) References Cited

U.S. PATENT DOCUMENTS

| | | | | |
|---|---|---|---|---|
| 4,485,639 A * | 12/1984 | Sakamoto | | F25D 21/04 165/104.21 |
| 9,523,522 B2 * | 12/2016 | Chou | | F25B 39/028 |
| 2003/0010477 A1 * | 1/2003 | Khrustalev | | F28D 15/0266 165/104.33 |
| 2005/0166399 A1 * | 8/2005 | Kroliczek | | F25B 23/006 29/890.07 |
| 2010/0000233 A1 * | 1/2010 | Groothuis | | F17C 5/06 62/50.2 |
| 2010/0018224 A1 * | 1/2010 | Zhang | | F25B 9/14 62/6 |
| 2010/0101762 A1 * | 4/2010 | Kroliczek | | F28D 15/043 165/104.26 |
| 2011/0030400 A1 * | 2/2011 | Agostini | | F28D 15/0266 62/118 |
| 2012/0285003 A1 * | 11/2012 | Ekstedt | | H05K 7/20681 29/592.1 |
| 2013/0019623 A1 * | 1/2013 | Jo | | F25D 11/025 62/190 |
| 2013/0077245 A1 * | 3/2013 | Gradinger | | F28D 1/035 361/700 |
| 2013/0152621 A1 * | 6/2013 | Lee | | F25D 11/025 62/441 |
| 2013/0160476 A1 * | 6/2013 | Lee | | F25D 11/02 62/291 |
| 2013/0256423 A1 * | 10/2013 | Lord | | F24D 19/00 237/2 A |
| 2013/0291559 A1 * | 11/2013 | June | | F25B 21/00 62/3.2 |
| 2014/0298850 A1 * | 10/2014 | Lee | | F25D 21/04 62/419 |
| 2015/0075184 A1 * | 3/2015 | Edwards | | F25B 21/02 62/3.2 |
| 2015/0077938 A1 * | 3/2015 | Espersen | | F28D 15/0266 361/700 |
| 2015/0096721 A1 * | 4/2015 | Mochizuki | | G21C 15/12 165/104.24 |
| 2015/0143831 A1 * | 5/2015 | Chou | | F28F 3/14 62/129 |
| 2015/0211803 A1 * | 7/2015 | Edwards | | F28D 15/0266 165/104.21 |
| 2015/0233617 A1 * | 8/2015 | Chou | | F25B 39/028 62/190 |
| 2015/0308750 A1 * | 10/2015 | Rice | | F28D 15/0266 165/104.26 |
| 2015/0369541 A1 * | 12/2015 | Dupont | | F28D 15/025 165/104.26 |
| 2015/0377540 A1 * | 12/2015 | Jo, II | | F25D 21/04 62/81 |
| 2016/0018139 A1 * | 1/2016 | Olsson | | F25B 21/02 62/3.3 |
| 2016/0061532 A1 * | 3/2016 | Espersen | | F28D 15/0266 165/104.21 |
| 2016/0123650 A1 * | 5/2016 | Liengaard | | F25D 21/04 62/275 |
| 2017/0205131 A1 * | 7/2017 | Yun | | F25D 11/025 |
| 2017/0307265 A1 * | 10/2017 | De La Rosa | | F25B 30/06 |
| 2017/0352935 A1 * | 12/2017 | Perdu | | H01M 10/6552 |
| 2017/0363365 A1 * | 12/2017 | Aoki | | F28D 15/0266 |
| 2018/0038660 A1 * | 2/2018 | Dinnage | | F28D 15/04 |
| 2018/0087831 A1 * | 3/2018 | Chou | | F25D 31/006 |
| 2018/0100676 A1 * | 4/2018 | Stitou | | F24S 10/70 |

\* cited by examiner

THERMOSIPHONS FOR USE WITH TEMPERATURE-REGULATED STORAGE DEVICES If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).
Priority Applications:
None.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

SUMMARY

Devices and systems relate to thermosiphons optimized for use with temperature-regulated storage devices. In some embodiments, a thermosiphon for use within a temperature-regulated storage device includes: a condenser region, including a plurality of evenly spaced condenser channels with horizontally symmetrical bifurcated branches connected to an adiabatic channel, each of the plurality of condenser channels connected at a top position to an upper channel; an evaporator region, including a plurality of evaporator channels, wherein each of the plurality of evaporator channels has a flow channel formed in a serpentine channel pattern and each subunit of the serpentine channel pattern is attached to a vapor return channel at a top of the subunit, and wherein the evaporator region has at least one lowest position connected directly to a vapor return channel; and an adiabatic region including at least one adiabatic channel connecting the evaporator channels and the condenser channels.

In some embodiments, a thermosiphon for use within a temperature-regulated storage device includes: a condenser region, including a plurality of evenly spaced condenser channels with horizontally symmetrical bifurcated branches connected to an adiabatic channel, each of the plurality of condenser channels connected at a top position to an upper channel; an evaporator region, including a plurality of evaporator channels, wherein each of the plurality of evaporator channels has a flow channel formed in a serpentine channel pattern and each subunit of the serpentine channel pattern is attached to a vapor return channel at a top of the subunit, and wherein the evaporator region has at least one lowest position connected directly to a vapor return channel; and an adiabatic region including at least one adiabatic channel connecting the evaporator channels to the condenser channels, wherein the thermosiphon is fabricated within a planar structure with a substantially flat face and a rounded face, and wherein the thermosiphon includes a predetermined load of refrigerant and a predetermined load of non-condensable gas.

In some embodiments, a temperature-regulated storage device includes: a thermal sink unit configured to contain phase-change material; a storage region including at least one wall; and a thermosiphon, including a condenser region, including a plurality of evenly spaced condenser channels with horizontally symmetrical bifurcated branches connected to an adiabatic channel, each of the plurality of condenser channels connected at a top position to an upper channel, an evaporator region, including a plurality of evaporator channels, wherein each of the plurality of evaporator channels has a flow channel formed in a serpentine channel pattern and each subunit of the serpentine channel pattern is attached to a vapor return channel at a top of the subunit, and wherein the evaporator region has at least one lowest position connected directly to a vapor return channel, and an adiabatic region including at least one adiabatic channel connecting the evaporator channels to the condenser channels, wherein the thermosiphon is fabricated within a planar structure with a substantially flat face and a rounded face, wherein the substantially flat face of the condenser region is positioned adjacent to the thermal sink unit and the flat face of the evaporator region is positioned adjacent to a wall of the storage region, and wherein the thermosiphon includes a predetermined load of refrigerant and a predetermined load of non-condensable gas.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
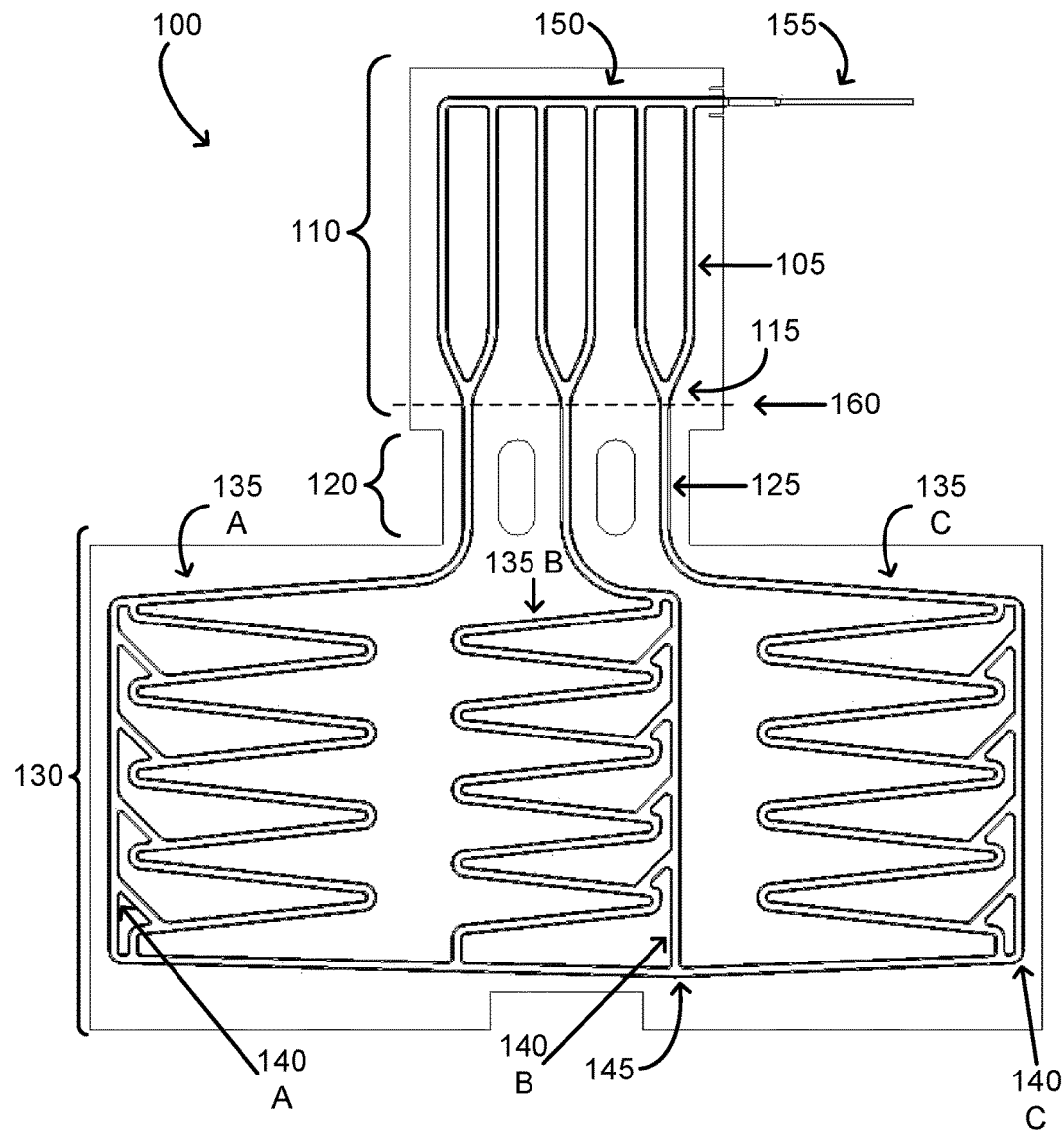
FIG. 1 is a schematic of a thermosiphon for use with a temperature-regulated storage device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Aspects of thermosiphons for use within temperature-regulated storage devices are described herein. In some embodiments, the thermosiphons are optimized for use with passive systems, such as thermosiphons that are configured to maintain a particular temperature range between the condenser region and the evaporator region for a given range of heat loads without external power requirements. In some embodiments, the thermosiphons are utilized with temperature-regulated storage devices that utilize electrical power intermittently, such as for a few hours per day or a few hours per week, while maintaining the internal temperature of an internal storage region in the predetermined range. In some embodiments, the temperature-regulated storage devices do not utilize electrical power to maintain the internal temperature of the storage region below ambient temperatures for a period of time ranging from hours to days.

In some embodiments, a thermosiphon for use within a temperature-regulated storage device includes: a condenser region, including a plurality of evenly spaced condenser channels with horizontally symmetrical bifurcated branches connected to an adiabatic channel, each of the plurality of condenser channels connected at a top position to an upper channel; an evaporator region, including a plurality of evaporator channels, wherein each of the plurality of evaporator channels has a flow channel formed in a serpentine channel pattern and each subunit of the serpentine channel pattern is attached to a vapor return channel at a top of the subunit, and wherein the evaporator region has at least one lowest position connected directly to a vapor return channel; and an adiabatic region including at least one adiabatic channel connecting the evaporator channels and the condenser channels.

FIG. 1 depicts aspects of a thermosiphon for use within a temperature-regulated storage device. In the embodiment illustrated, the thermosiphon is a substantially planar device. For example, in some embodiments, the thermosiphon is fabricated from a roll-bond material. A roll-bond material can be a material fabricated with a substantially smooth face and an opposing face with curves or ridges. In some embodiments the thermosiphon is fabricated from a substantially planar material and then bent or curved as desired to fit with a temperature-regulated storage device. In some embodiments the thermosiphon is configured as at least two planar surfaces with an angle between the surfaces.

In the embodiment shown in FIG. 1, the thermosiphon 100 includes a condenser region 110, an adiabatic region 120 and an evaporator region 130. The condenser region 110 includes a plurality of evenly spaced condenser channels 105 with horizontally symmetrical bifurcated branches 115, each connected to an adiabatic channel 125. In the illustrated embodiment, there are a plurality of horizontally symmetrical bifurcated branches 115 each of which are connected to one of a plurality of adiabatic channels 125. Each of the plurality of condenser channels 105 are connected at a top position to an upper channel 150. The evaporator region 130 includes a plurality of evaporator channels 135 A, 135 B, 135 C, wherein each of the plurality of evaporator channels 135 A, 135 B, 135 C has a flow channel formed in a serpentine channel pattern and each subunit of the serpentine channel pattern is attached to a vapor return channel 140 A, 140 B, 140 C at a top of the subunit. The evaporator region 130 has at least one lowest position 145 connected directly to a vapor return channel 140 B. The adiabatic region includes at least one adiabatic channel 125 connecting the evaporator channels 135 and the condenser channels 105. The thermosiphon 100 is configured to be substantially vertical when oriented for use within the temperature-regulated storage device, with the condenser region 110 substantially above the evaporator region 130 and the adiabatic region 120 positioned between the condenser region 110 and the evaporator region 130.

In the illustrated embodiment, the upper channel 150 of the condenser region 110 is attached to a fill port 155. For example, a fill port can be a pipe or similar fitting extending from the upper channel. The fill port can be configured to add or purge gas and/or refrigerant during manufacture, and then to be sealed for use of the thermosiphon. For example during manufacture, in some embodiments, a fill port can be utilized to remove any unwanted non-condensable gas subsequent to the refrigerant charge.

In some embodiments, the adiabatic region includes multiple adiabatic channels positioned substantially in parallel between the evaporator channels and the condenser channels. For example, there can be a single adiabatic channel connecting each single evaporator channel to a single condenser channel. Each of the single adiabatic channels can be positioned in parallel relative to each other. Each of the single adiabatic channels can be positioned so that they are substantially equidistant relative to each other. In some embodiments, at least one adiabatic channel within the adiabatic region is a two-phase channel which permits both liquid flow downwards and vapor flow upwards simultaneously.

The evaporator region of the thermosiphon includes a plurality of channels. In some embodiments the plurality of evaporator channels include a plurality of two-phase channels, which permit both liquid flow downwards and vapor flow upwards simultaneously. In some embodiments, the plurality of evaporator channels are evenly spaced from each other along the main axis of the thermosiphon. For example, FIG. 1 depicts a plurality of evaporator channels positioned substantially in parallel with the long axis of the thermosiphon, or the top to bottom main axis in the illustration. In some embodiments, the plurality of evaporator channels of the evaporator region each have a minimum angle of flow greater than the expected maximum tilt of the temperature-regulated storage device when it is in use. For example, a given temperature-regulated storage device can include operating instructions to not operate the device with a tilt higher than 5%, or 10%.

In some embodiments the plurality of evaporator channels in the evaporator region are expected to be substantially isothermal during use. For example the evaporator channels can be of a size, shape and configuration such that the liquid refrigerant condensate within the channels must follow the serpentine path as the condensate falls within the channels. The liquid refrigerant condensate within the channels creates an interior wetted surface throughout the interior of the evaporator channels. Since the serpentine path of the evaporator channels traverses a large portion of the evaporator region, the entire evaporator region approximates an isothermal region. Additionally, in some embodiments the optimal level of refrigerant within the thermosiphon is the minimal amount required to keep the interior surfaces of the evaporator channels wetted and to prevent dryout during the expected use conditions.

A thermosiphon as described herein includes an interior volume with at least one non-condensable gas and a refrigerant. During manufacture, the interior of the thermosiphon is substantially evacuated of air and both the refrigerant and non-condensable gas added in to preset amounts prior to the thermosiphon being sealed with a gas- and liquid-impermeable seal. The gas- and liquid-impermeable seal is fabricated to be durable throughout the use life of the thermosiphon. In the expected temperature range of operation, the refrigerant exists in both the liquid phase and the vapor phase within the interior of the thermosiphon. An operational thermosiphon includes a predetermined amount of both refrigerant and non-condensable gas sealed within the interior of the thermosiphon. In some embodiments, a non-condensable gas includes an inert gas such as nitrogen or argon. In some embodiments, a thermosiphon is fabricated within a planar structure with a substantially flat face and a rounded face, and wherein the thermosiphon includes a predetermined load of refrigerant and a predetermined load of non-condensable gas.

In some embodiments, an operational thermosiphon includes an interior load of refrigerant and non-condensable gas relative to the heat load at use of the temperature-regulated storage device and the saturation pressure of the refrigerant at the expected temperature range of use. FIG. 1 depicts a line 160 estimating a location on the thermosiphon where the non-condensable gas is substantially above the line during use of the thermosiphon. The line 160 depicted in FIG. 1 is located at a position adjacent to the bifurcated branches of the condenser region, distal to the upper channel. As the heat load and refrigerant saturation pressure increases, the non-condensable gas is compressed, causing the boundary of the non-condensable gas indicated by line 160 to rise, opening additional accessible condensing surface area to moderate the rise in evaporator temperature. In some embodiments, a thermosiphon includes an interior load of refrigerant and non-condensable gas sufficient to maintain a non-linear relationship between the temperature gradient between the condenser region and the evaporator region relative to a linearly increasing heat load. Additionally, the system functions with a non-linear relationship so that the thermal resistance is inversely proportional to the heat load on the system.

Embodiments of thermosiphons as described herein are designed for use within temperature-regulated storage devices utilizing heat transfer across the thermosiphon to assist in maintaining a temperature of a storage region in a specific temperature range with low or minimal power requirements. For example, in some embodiments, a temperature-regulated storage device utilizing a thermosiphon such as those described herein is configured to maintain the temperature of an internal storage region in the range above 0 degrees Centigrade and below 10 degrees Centigrade with an ambient temperature between 10 degrees Centigrade and 43 degrees Centigrade. In some embodiments, a temperature-regulated storage device utilizing a thermosiphon such as those described herein is configured to maintain the temperature of an internal storage region in the range between 2 degrees Centigrade and 8 degrees Centigrade with an ambient temperature between 10 degrees Centigrade and 43 degrees Centigrade. In some embodiments, a temperature-regulated storage device utilizing a thermosiphon such as those described herein is configured to maintain the temperature of an internal storage region in the range between 0 degrees Centigrade and 4 degrees Centigrade with an ambient temperature between 10 degrees Centigrade and 43 degrees Centigrade. In some embodiments, a thermosiphon such as those described herein is configured to maintain the temperature of an internal storage region in a range, such as one of those above, with an ambient temperature in the range above 0 degrees Centigrade and below 55 degrees Centigrade.

In some embodiments, a temperature-regulated storage device includes: a thermal sink unit configured to contain phase-change material; a storage region including at least one wall; and a thermosiphon, including a condenser region, including a plurality of evenly spaced condenser channels with horizontally symmetrical bifurcated branches connected to an adiabatic channel, each of the plurality of condenser channels connected at a top position to an upper channel, an evaporator region, including a plurality of evaporator channels, wherein each of the plurality of evaporator channels has a flow channel formed in a serpentine channel pattern and each subunit of the serpentine channel pattern is attached to a vapor return channel at a top of the subunit, and wherein the evaporator region has at least one lowest position connected directly to a vapor return channel, and an adiabatic region including at least one adiabatic channel connecting the evaporator channels to the condenser channels, wherein the thermosiphon is fabricated within a planar structure with a substantially flat face and a rounded face, wherein the substantially flat face of the condenser region is positioned adjacent to the thermal sink unit and the flat face of the evaporator region is positioned adjacent to a wall of the storage region, and wherein the thermosiphon includes a predetermined load of refrigerant and a predetermined load of non-condensable gas. In some embodiments, the substantially flat face of the condenser region is thermally coupled to the thermal sink unit and the flat face of the evaporator region is thermally coupled to a wall of the storage region, and wherein the thermosiphon includes a predetermined load of refrigerant and a predetermined load of non-condensable gas.

Figure 2:
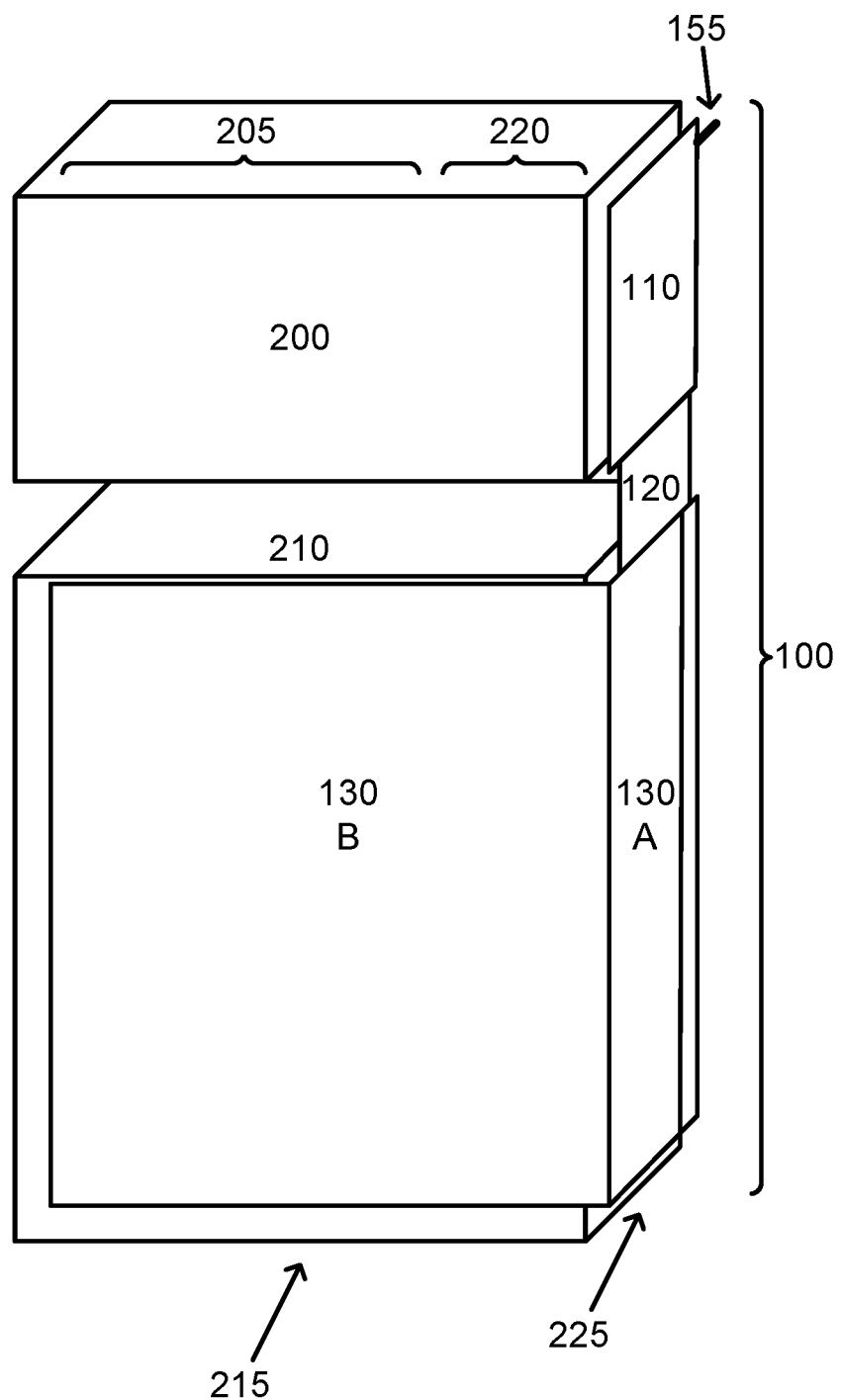
FIG. 2 is a schematic of a temperature-regulated storage device including a thermosiphon.

FIG. 2 depicts aspects of an embodiment of a thermosiphon 100 positioned as it would be for use within a temperature-regulated storage device. The thermosiphon 100 includes a condenser region 110, an adiabatic region 120 and an evaporator region 130. A fill port 155 is affixed to the upper portion of the condenser region 110. The temperature-regulated storage device includes a thermal sink unit 200 configured to contain phase-change material. For example, in some embodiments, a thermal sink unit can be configured to contain an oil-based phase change material. A thermal sink unit can be fabricated in a manner and with materials to contain a phase change material in both a liquid form and a solid form. For example, in some embodiments, a thermal sink unit can be configured to operate with a phase change material that is water/ice, and the container can be watertight. In some embodiments, a thermal sink unit can be positioned adjacent to the condenser region of a thermosiphon. In some embodiments, a thermal sink unit can be positioned to be thermally coupled to the condenser region of a thermosiphon.

In some embodiments, a temperature-regulated storage device includes a thermal sink unit configured to hold phase change material in both a solid form and a liquid form in regions or areas of the thermal sink unit. As illustrated in FIG. 2, in some embodiments a thermal sink unit 200 configured to hold water and ice can be configured so that the water phase is predominately in a position 220 adjacent to the condenser region 110 of a thermosiphon 100 and the ice phase is predominately in a position 205 distal to the condenser region 110. In some embodiments of a thermosiphon within a temperature-regulated storage device, the condenser region of the thermosiphon includes a surface positioned adjacent to the expected water region of a water-ice mixture tank when the temperature-regulated storage device is in use. In some embodiments of a thermosiphon within a temperature-regulated storage device, the condenser region of the thermosiphon includes a surface thermally coupled to the expected water region of a water-ice mixture tank when the temperature-regulated storage device is in use. The positioning of the condenser region of the thermosiphon relative to the thermal sink unit can maintain the temperature of the condenser region at the phase change temperature of the phase change material utilized in the device during use.

In the embodiment shown in FIG. 2, the thermosiphon 100 is fabricated as a planar structure with at least one substantially flat face. In FIG. 2, the thermosiphon 100 is depicted slightly apart from the thermal sink unit 200 and the storage region 210 for purposes of illustration. In some embodiments, a thermosiphon 100 is positioned with at least one face in direct contact with a surface of the thermal sink unit 200 and a surface of an internal storage region 210. In the embodiment shown in FIG. 2, the substantially flat face of the condenser region 110 is positioned adjacent to a surface of the thermal sink unit 200. In addition, the evaporator region 130 includes two planar sections 130 A, 130 B, each of which are positioned adjacent to a wall 215, 225 of the internal storage region 210. In some embodiments, the evaporator region of a thermosiphon is thermally coupled to a wall of the internal storage region. An adiabatic region 120 is positioned between the condenser region 110 and the evaporator region 130.

In some embodiments, a thermosiphon includes a condenser region with a gas-holding channel attached to the upper channel, the gas-holding channel including an interior space of a specific size to contain a volume of a non-condensable gas. For example, a thermosiphon within a temperature-regulated storage device can include an extra volume of non-condensable gas within the thermosiphon greater than the volume in an otherwise similar thermosiphon without the gas-holding channel.

Figure 3:
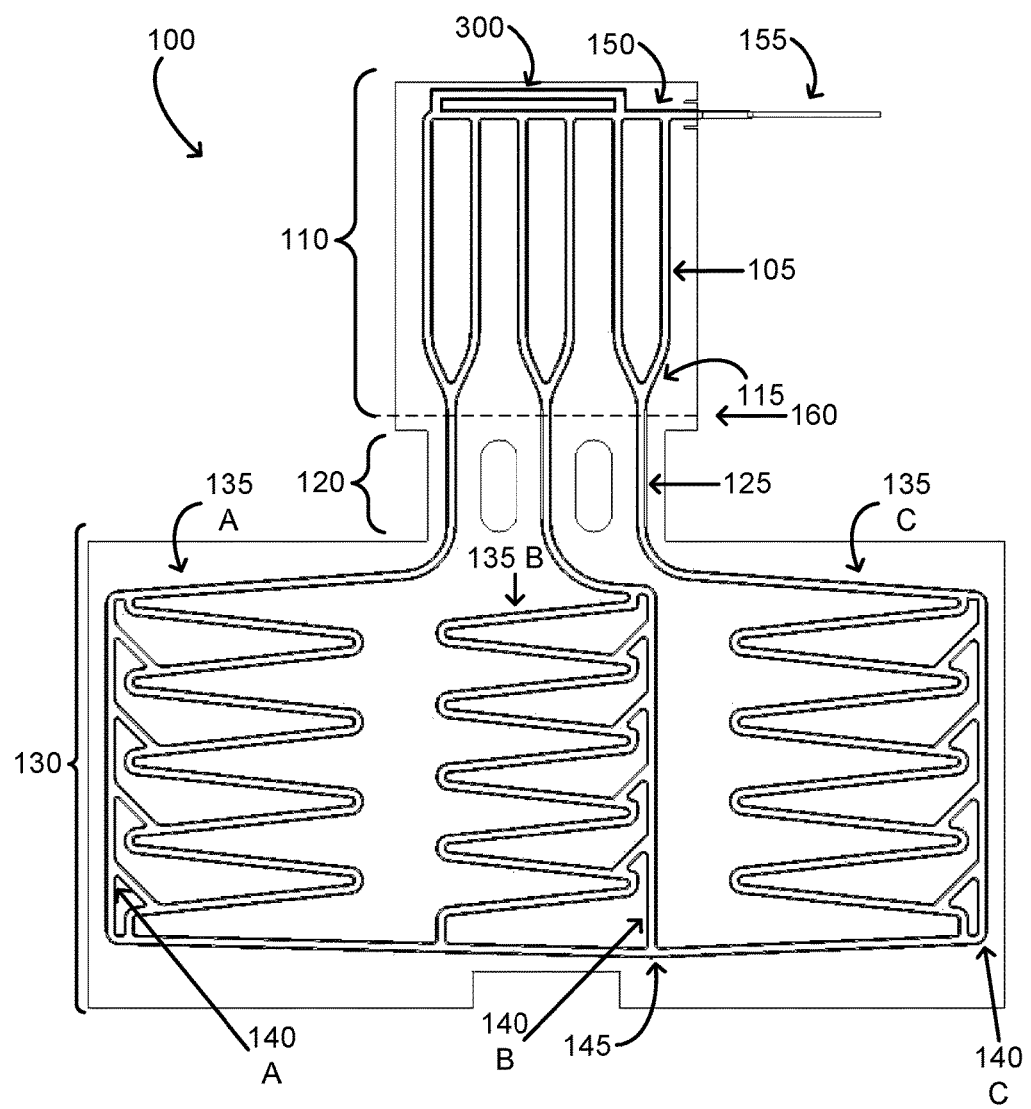
FIG. 3 is a schematic of a thermosiphon for use with a temperature-regulated storage device.

FIG. 3 depicts a thermosiphon 100 including a condenser region 110, an adiabatic region 120 and an evaporator region 130. The thermosiphon embodiment shown in FIG. 3 is similar to that depicted in FIG. 1, with the addition of a gas-holding channel 300 positioned adjacent to the upper channel 150 of the condenser region 110. The gas-holding channel 300 is above and connected to the upper channel 150. A fill port 155 is attached to the upper channel 150. During manufacture, a thermosiphon such as that depicted in FIG. 3 can have a non-condensable gas introduced into the fill port in sufficient quantity such that the normal thermosiphon operating pressure to fill the condenser region, including the gas-holding channel, from the top down to a gas fill line just below the bifurcated branches of the condenser channels. See, e.g. line 160 in FIG. 3 as an example.

Some embodiments include a thermosiphon including: a refrigerant reservoir; an inlet channel to the refrigerant reservoir; and an outlet channel from the refrigerant reservoir. Some embodiments further include: a heating element; a sensor; and a controller configured to receive data from the sensor and to send control signals to the heating element in response to the received data. In embodiments of a temperature-regulated storage device including a refrigerant reservoir, the refrigerant reservoir can be positioned distal to the thermosiphon, while remaining attached to the thermosiphon. In some embodiments there is a battery operably attached to the controller. In some embodiments there is a battery operably attached to the heating element. In some embodiments there is a battery operably attached to a sensor.

Figure 4:
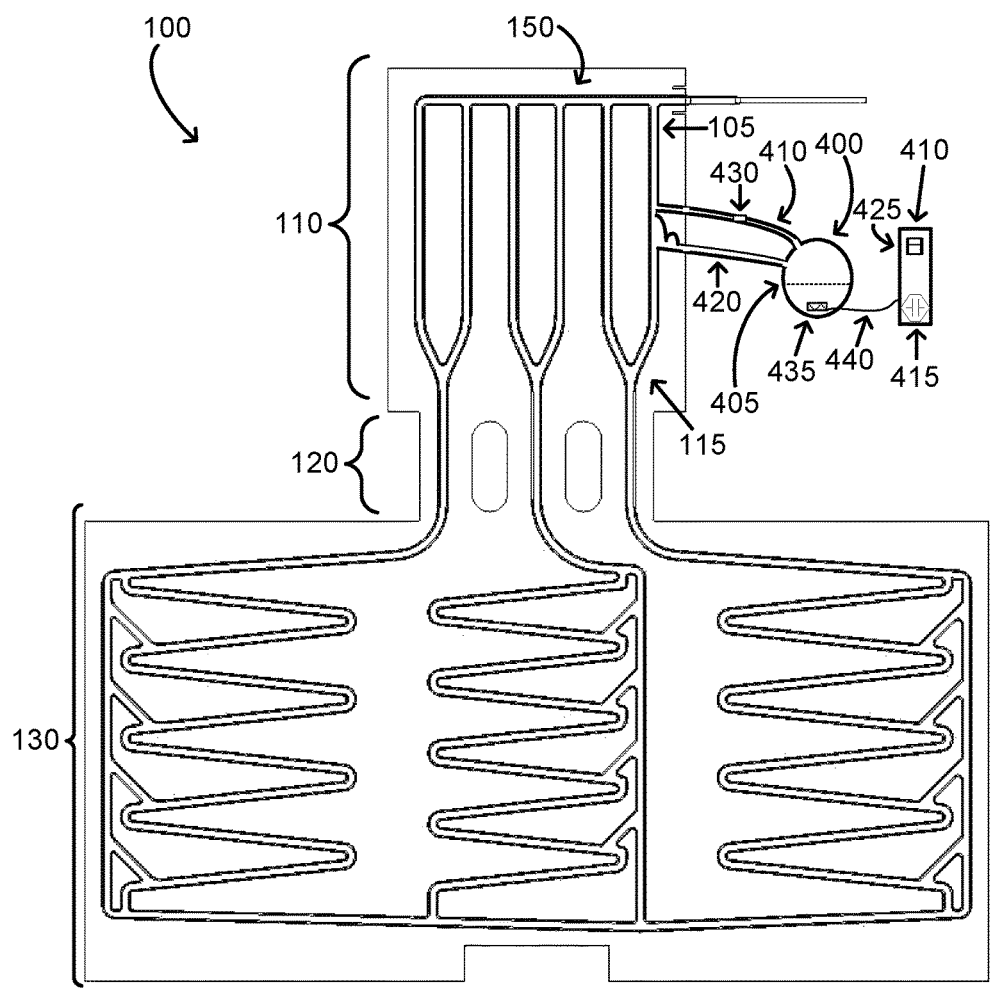
FIG. 4 is a schematic of a thermosiphon for use with a temperature-regulated storage device.

FIG. 4 depicts a thermosiphon 100 including a condenser region 110, an adiabatic region 120 and an evaporator region 130. The embodiment of a thermosiphon 100 depicted in FIG. 4 includes a refrigerant reservoir 400. The refrigerant reservoir 400 is connected to a condenser channel 105 of the condenser region 110 at a position between the upper channel 150 and a lower bifurcated branch point 115. The refrigerant reservoir 400 is connected to the condenser channel 105 with a first connector 410 and a second connector 420. The interior of each of the refrigerant reservoir 400, the first connector 410 and the second connector 420 are joined to the interior of the thermosiphon 100, and similarly sealed from gas or vapor dispersal to the exterior of the device. A flow check unit 430 is positioned along the length of the first connector 410 and oriented so that the flow check unit 430 can control the rate of flow through the first connector 410. In some embodiments a flow check unit is a valve. In some embodiments a flow check unit is a constrictor.

The refrigerant reservoir 400 includes a heating element 435 attached to the reservoir. In the illustrated embodiment, the heating element 435 is positioned below an expected refrigerant fill line 405 so that during use the heating element 435 is positioned adjacent to the refrigerant in the reservoir. The heating element 435 is attached with a wire connector 440 to a controller unit 410. The controller unit includes a controller 425 and a sensor 415. In some embodiments, the sensor is a temperature sensor. The controller 425 is configured to receive data from the sensor 415 and to send control signals to the heating element 435 in response to the received data. In some embodiments, a battery is attached to the controller unit, for example embedded within the controller unit. The sensor can be positioned to sense an environmental condition, such as the ambient temperature around a temperature-regulated storage device in which the components are integrated.

In some embodiments, a thermosiphon includes an attached refrigerant reservoir with a heating element under the control of an attached controller. The attached controller can be configured to send on/off signals to the heating element in response to a minimum external temperature sensed by an attached temperature sensor. For example, in situations wherein the external temperature of a temperature-regulated storage device is above a predetermined temperature which has been calculated to be the maximum for functional operation of the temperature-regulated storage device, the controller can cause additional refrigerant to be introduced into the refrigerant reservoir, actuating the controller unit affixed to a refrigerant return channel. The increased refrigerant can improve the thermal performance of the thermosiphon given the additional heat load conditions.

In some embodiments, a thermosiphon includes: a refrigerant reservoir; an inlet channel to the refrigerant reservoir; and an outlet channel from the refrigerant reservoir, wherein the outlet channel from the refrigerant reservoir has a much slower flow rate than the inlet channel. The slower flow rate of the outlet channel can serve as a control element for the system. The slower flow rate can be caused, for example, from an outlet channel with a narrower diameter than the inlet channel diameter. The slower flow rate can be caused, for example, from an outlet channel with a region along its length with a narrower diameter than the inlet channel diameter, such as a region including an internal constriction in the outlet channel.

Figure 5:
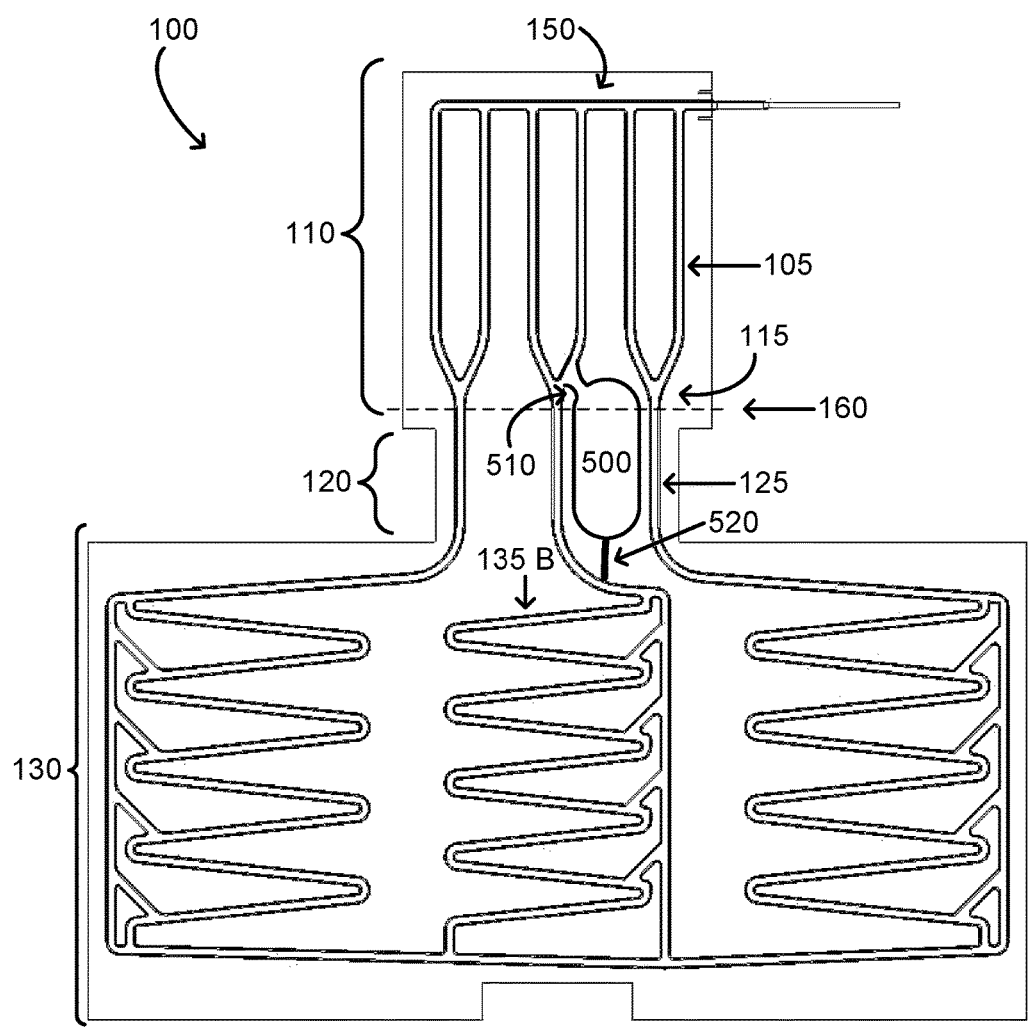
FIG. 5 is a schematic of a thermosiphon for use with a temperature-regulated storage device.

FIG. 5 depicts a thermosiphon 100 including a condenser region 110, an adiabatic region 120 and an evaporator region 130. The thermosiphon is configured to operate in a substantially vertical position, e.g. as shown in FIG. 5. A refrigerant reservoir 500 is positioned within the structure of the thermosiphon 100. The top of the refrigerant reservoir 500 is attached to a condenser channel 105 with an inlet channel 510 at a point adjacent to the bifurcated branch point 115. During manufacture, the refrigerant reservoir 500 is positioned and filled so that during use the expected fill line for refrigerant within the reservoir is approximately the same as the expected level of the expected non-condensable gas 160. An outlet channel 520 connects a bottom region of the refrigerant reservoir 500 to one of the evaporation channels 135 B within the evaporator region 130.

In the embodiment shown in FIG. 5, the outlet channel 520 has a narrower average diameter than the inlet channel 510. The position of the inlet channel 510 and the outlet channel 520 as well as the expected flow rate of the refrigerant through the system during use are calibrated so that at low heat loads the position of the inlet channel 510 is above the expected location of the non-condensable gas line 160. It is expected that during low heat loads there will be minimal condensation above the inlet channel 510 and any liquid in the reservoir will be emptied out through outlet channel 520, raising the level of the liquid refrigerant in the evaporator region and reducing the thermal efficiency. When the non-condensable gas barrier has been pushed up due to a higher refrigeration saturation pressure during use, there will be condensation above the inlet channel 510 and liquid refrigerant will flow into the refrigerant reservoir through the inlet channel 510. Refrigerant will also flow out of the refrigerant reservoir 520 through the outlet channel 520, but on average at a rate sufficiently slow to maintain a desired level of refrigerant within the refrigerant reservoir 500. In some embodiments, the relative diameter of an inlet channel and an outlet channel will be calibrated relative to the expected temperature range of use.

Figure 6:
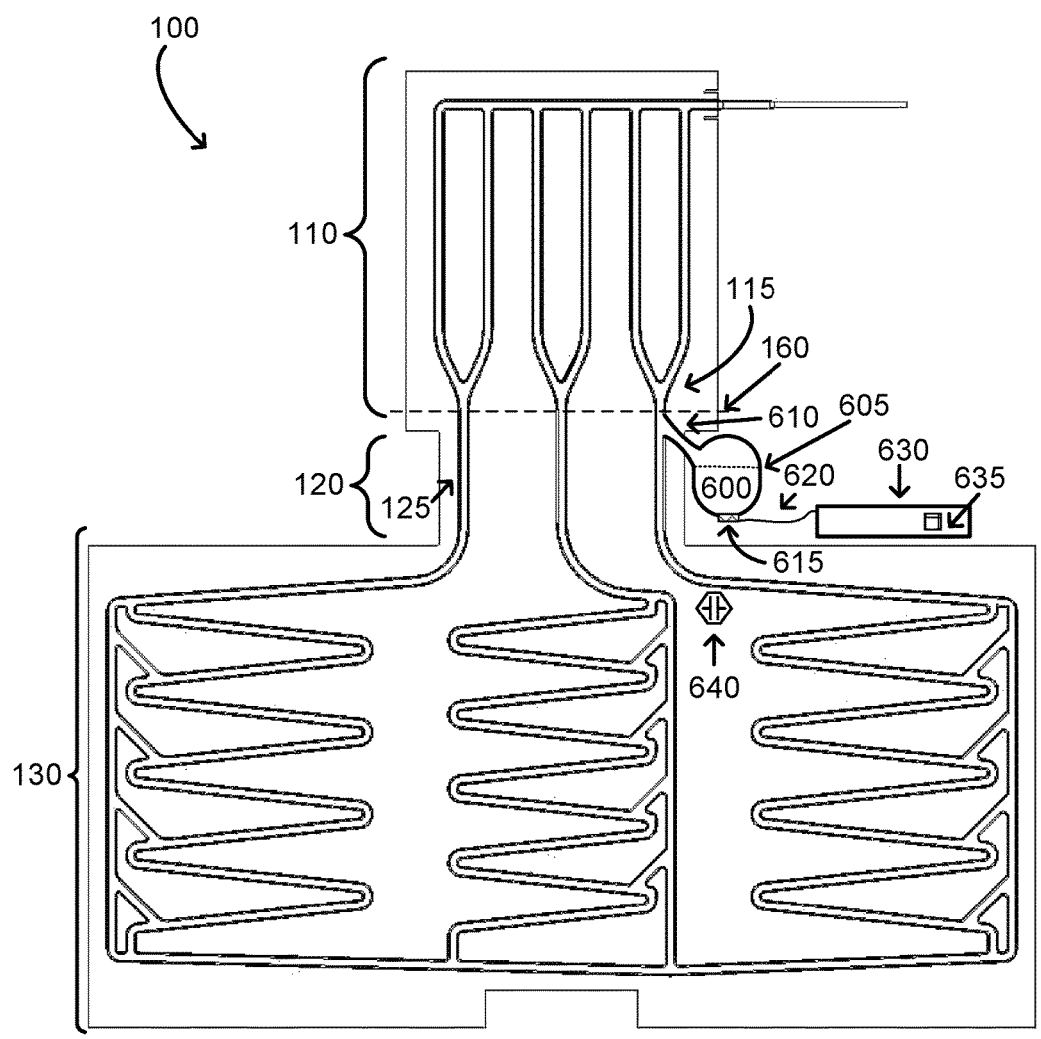
FIG. 6 is a schematic of a thermosiphon for use with a temperature-regulated storage device.

FIG. 6 illustrates an embodiment of a thermosiphon 100 including a condenser region 110, an adiabatic region 120 and an evaporator region 130. In the illustrated embodiment, the thermosiphon 100 includes a refrigerant reservoir 600 attached to an adiabatic channel 125 at a position lower than the expected location of the non-condensable gas line 160 with a reservoir channel 600. In some embodiments, the refrigerant reservoir is attached to an adiabatic channel above or without reference to the expected location of the non-condensable gas line. The refrigerant reservoir 600 has a thermoelectric device 615 attached to the refrigerant reservoir 600 at a position operable to both heat and cool liquid refrigerant within the refrigerant reservoir 600. For example, the thermoelectric device can include a thermoelectric heat pump and/or a Peltier device, depending on the embodiment. The thermoelectric device 615 is operably connected with a wire connector 620 to a controller 630. The controller 630 includes circuitry 635 configured to send control signals to the thermoelectric device 615. A sensor 640 is operably connected to the controller 630. The circuitry 635 can be configured to send control signals to the thermoelectric device 615 in response to signals received from the sensor 640. In some embodiments, a sensor is a temperature sensor.

During use of an embodiment of a thermosiphon including a refrigerant reservoir attached to an adiabatic channel similar to that shown in FIG. 6, wherein a thermoelectric device is attached to the refrigerant reservoir, the thermoelectric device can be heated and cooled in response to a sensed condition. In some embodiments, the thermoelectric device can be heated and cooled in response to circuitry in the controller that accepts data from one or more attached sensors and sends control signals to the thermoelectric device in response to the accepted data. When the thermoelectric device is heating the refrigerant reservoir, liquid refrigerant stored in the reservoir will evaporate and move into the attached channel. When the thermoelectric device is cooling the refrigerant reservoir, liquid refrigerant will condense and return to the reservoir. For example, in a use situation wherein the controller is attached to a temperature sensor positioned on the evaporator region of the thermosiphon, the controller can include circuitry configured to turn on the heat function in the thermoelectric device when data from the sensor indicates that the thermosiphon temperature is below a minimum temperature. Similarly, the embodiment can include circuitry configured to turn on the cooling function in the thermoelectric device when data from the sensor indicates that the thermosiphon temperature is above a minimum temperature. The controller can include circuitry configured to turn on either the heating or cooling functions of the thermoelectric device for a preset period of time and then to end the heating or cooling functions.

EXAMPLES

Example 1. Determination of Thermal Resistance Vs Heat Load Over a Range of Expected Use Conditions A thermosiphon used within a temperature-regulated storage device was tested for the thermal resistance (calculated as T_Evap−T_Cond/Heat load) across the syphon for a variety of heat loads covering the intended operational envelope of the temperature-regulated storage device. A single device was charged with a typical amount of non-condensable gas and refrigerant prior to the first set of tests. The thermosiphon within the device was then purged of non-condensable gas, and the tests were repeated under each of the same conditions. The resulting data is shown as FIG. 7. For each measured data point shown in FIG. 7, the device was stabilized until thermal equilibrium was reached at that condition.

The heat load for each data point was controlled by installing a resistive heater with a fan into the storage region of the device, and stabilization of the ambient temperature surrounding the device very close to the storage region temperature in order to minimize heat leak in/out of the storage region. The non-condensable comparison plot shown in FIG. 7 compares the thermal resistance of an exemplary thermosiphon within a device.

Figure 7:
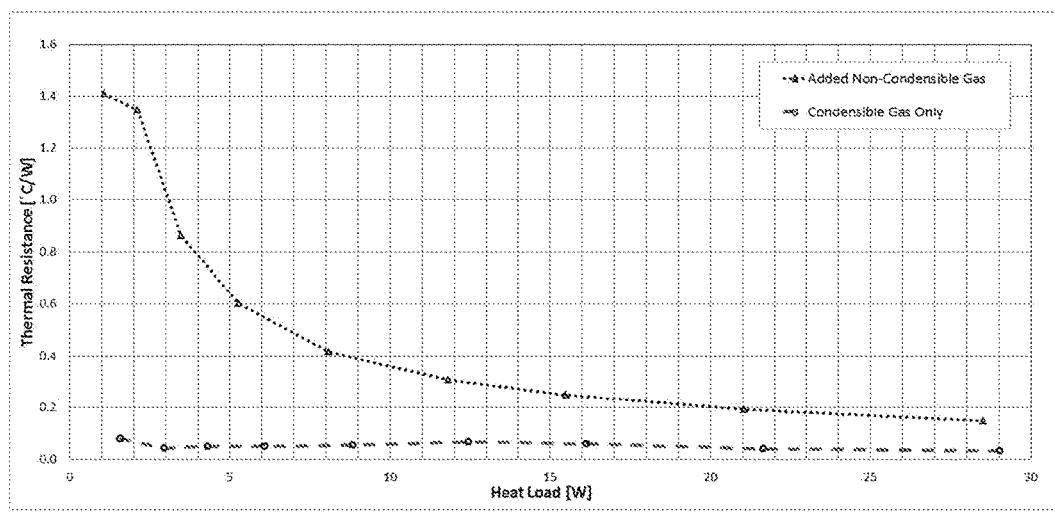
FIG. 7 depicts experimental results of a thermosiphon.

FIG. 7 illustrates to the right side of the graph that for higher heat loads, performance between thermosiphons charged with only refrigerant and those charged with both refrigerant and non-condensable gas are similar. However for lower heat loads, particularly those under approximately 5 W, a thermosiphon including non-condensable gas as well as refrigerant has a different thermal resistance from the same thermosiphon without added non-condensable gas. Therefore during use at low heat loads, e.g. near the lower end of the expected use range, a thermosiphon including non-condensable gas and refrigerant will provide less cooling effect to an adjacent storage region of a device. This property can be useful, for example, to minimize excessive cooling of a storage region of a device below a desirable level.

Example 2. Holdover Time of a Storage Region of a Temperature-Regulated Storage Device without External Power A temperature-regulated storage device including a thermosiphon with both refrigerant and non-condensable gas as described herein was tested for stability and holdover time in the absence of external electrical power. The device included a thermal sink unit holding mostly frozen water ice at the beginning of the testing. The device was calibrated to maintain the interior of the storage region in a temperature range between 2 to 8 degrees C. with a 43 degree ambient temperature surrounding the device.

Figure 8:
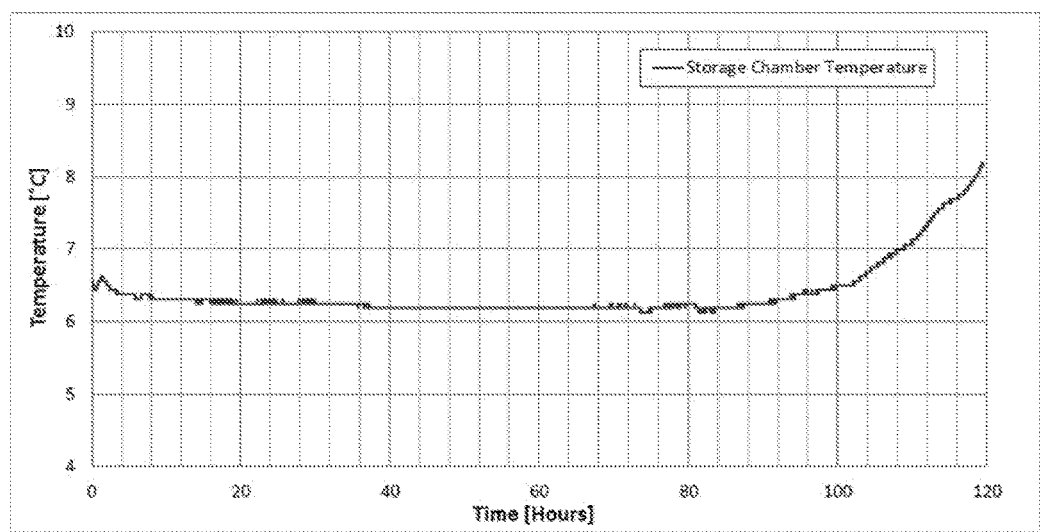
FIG. 8 depicts experimental results of a temperature-regulated storage device including a thermosiphon.

FIG. 8 illustrates the temperature within the storage region, as detected by a sensor positioned adjacent to an interior wall of the storage region, over time. The storage region temperature maintains a steady temperature above 6 degrees C. and below 7 degrees C. for at least 100 hours. At approximately 100 hours of testing, the ice used within the thermal sink unit adjacent to the condenser region of the thermosiphon had completely melted.

Aspects of the subject matter described herein are set out in the following numbered clauses:

1. A thermosiphon for use within a temperature-regulated storage device, including: a condenser region, including a plurality of evenly spaced condenser channels with horizontally symmetrical bifurcated branches connected to an adiabatic channel, each of the plurality of condenser channels connected at a top position to an upper channel; an evaporator region, including a plurality of evaporator channels, wherein each of the plurality of evaporator channels has a flow channel formed in a serpentine channel pattern and each subunit of the serpentine channel pattern is attached to a vapor return channel at a top of the subunit, and wherein the evaporator region has at least one lowest position connected directly to a vapor return channel; and an adiabatic region including at least one adiabatic channel connecting the evaporator channels and the condenser channels.
2. The thermosiphon of paragraph 1, wherein the thermosiphon is substantially vertical when oriented for use within the temperature-regulated storage device.
3. The thermosiphon of paragraph 1, wherein the condenser region is positioned to be substantially above the evaporator region and the adiabatic region when the thermosiphon is oriented for use within the temperature-regulated storage device.
4. The thermosiphon of paragraph 1, wherein the condenser region includes: a fill port operably attached to the upper channel.
5. The thermosiphon of paragraph 1, wherein the condenser region includes: a gas-holding channel attached to the upper channel, the gas-holding channel including an interior space of a specific size to contain a volume of a non-condensable gas.
6. The thermosiphon of paragraph 1, wherein the condenser region includes a surface positioned adjacent to the expected water region of a water-ice mixture tank when the temperature-regulated storage device is in use.
7. The thermosiphon of paragraph 1, wherein the adiabatic region includes: multiple adiabatic channels positioned substantially in parallel between the evaporator channels and the condenser channels.
8. The thermosiphon of paragraph 1, wherein the at least one adiabatic channel of the adiabatic region includes: a two-phase channel.
9. The thermosiphon of paragraph 1, wherein the plurality of evaporator channels of the evaporator region includes: a plurality of two-phase channels.
10. The thermosiphon of paragraph 1, wherein the plurality of evaporator channels of the evaporator region are evenly spaced from each other along the main axis of the thermosiphon.
11. The thermosiphon of paragraph 1, wherein the plurality of evaporator channels of the evaporator region each have a minimum angle of flow greater than the expected maximum tilt of the temperature-regulated storage device when in use.
12. The thermosiphon of paragraph 1, wherein the plurality of evaporator channels of the evaporator region are expected to be substantially isothermal during use.
13. The thermosiphon of paragraph 1, wherein the thermosiphon is fabricated from a roll-bond material.
14. The thermosiphon of paragraph 1, wherein the thermosiphon is configured as at least two planar surfaces with an angle between the surfaces.
15. The thermosiphon of paragraph 1, wherein the thermosiphon includes an interior load of refrigerant and non-condensable gas relative to the heat load at use of the temperature-regulated storage device and the saturation pressure of the expected temperature range of use.
16. The thermosiphon of paragraph 1, wherein the thermosiphon includes an interior load of refrigerant and non-condensable gas sufficient to position an estimated position of a bulk of the non-condensable gas within the adiabatic region adjacent to the horizontally symmetrical bifurcated branches of the condenser region.
17. The thermosiphon of paragraph 1, further including: a refrigerant reservoir; an inlet channel to the refrigerant reservoir; and an outlet channel from the refrigerant reservoir.
18. The thermosiphon of paragraph 17, further including: a heating element; a sensor; and a controller configured to receive data from the sensor and to send control signals to the heating element in response to the received data.
19. The thermosiphon of paragraph 1, further including: a refrigerant reservoir; a channel between the refrigerant reservoir and at least one channel in the condenser region; a thermoelectric device operably attached to the refrigerant reservoir; a sensor; and a controller configured to receive data from the sensor and to send control signals to the thermoelectric device in response to the received data.
20. A thermosiphon for use within a temperature-regulated storage device, including: a condenser region, including a plurality of evenly spaced condenser channels with horizontally symmetrical bifurcated branches connected to an adiabatic channel, each of the plurality of condenser channels connected at a top position to an upper channel; an evaporator region, including a plurality of evaporator channels, wherein each of the plurality of evaporator channels has a flow channel formed in a serpentine channel pattern and each subunit of the serpentine channel pattern is attached to a vapor return channel at a top of the subunit, and wherein the evaporator region has at least one lowest position connected directly to a vapor return channel; and an adiabatic region including at least one adiabatic channel connecting the evaporator channels to the condenser channels, wherein the thermosiphon is fabricated within a planar structure with a substantially flat face and a rounded face, and wherein the thermosiphon includes a predetermined load of refrigerant and a predetermined load of non-condensable gas.

21. The thermosiphon of paragraph 20, wherein the thermosiphon is substantially vertical when oriented for use within the temperature-regulated storage device.

22. The thermosiphon of paragraph 20, wherein the condenser region is positioned to be substantially above the evaporator region and the adiabatic region when the thermosiphon is oriented for use within the temperature-regulated storage device.

23. The thermosiphon of paragraph 20, wherein the condenser region includes: a fill port operably attached to the upper channel.

24. The thermosiphon of paragraph 20, wherein the condenser region includes: a gas-holding channel attached to the upper channel, the gas-holding channel including an interior space of a specific size to contain a volume of a non-condensable gas.

25. The thermosiphon of paragraph 20, wherein the substantially flat face of the condenser region includes a surface positioned adjacent to the expected water region of a water-ice mixture tank when the temperature-regulated storage device is in use.

26. The thermosiphon of paragraph 20, wherein the adiabatic region includes: multiple adiabatic channels positioned substantially in parallel between the evaporator channels and the condenser channels.

27. The thermosiphon of paragraph 20, wherein the at least one adiabatic channel of the adiabatic region includes: a two-phase channel.

28. The thermosiphon of paragraph 20, wherein the plurality of evaporator channels of the evaporator region includes: a plurality of two-phase channels.

29. The thermosiphon of paragraph 20, wherein the plurality of evaporator channels of the evaporator region are evenly spaced from each other along the main axis of the thermosiphon.

30. The thermosiphon of paragraph 20, wherein the plurality of evaporator channels of the evaporator region each have a minimum angle of flow greater than the expected maximum tilt of the temperature-regulated storage device when in use.

31. The thermosiphon of paragraph 20, wherein the plurality of evaporator channels of the evaporator region are expected to be substantially isothermal during use.

32. The thermosiphon of paragraph 20, wherein the thermosiphon is fabricated from a roll-bond material.

33. The thermosiphon of paragraph 20, wherein the thermosiphon is configured as at least two planar surfaces with an angle between the surfaces.

34. The thermosiphon of paragraph 20, wherein the thermosiphon includes an interior load of refrigerant and non-condensable gas relative to the heat load at use of the temperature-regulated storage device and the saturation pressure of the expected temperature range of use.

35. The thermosiphon of paragraph 20, wherein the thermosiphon includes an interior load of refrigerant and non-condensable gas sufficient to position an estimated position of a bulk of the non-condensable gas within the adiabatic region adjacent to the horizontally symmetrical bifurcated branches of the condenser region.

36. The thermosiphon of paragraph 20, further including: a refrigerant reservoir; an inlet channel to the refrigerant reservoir; and an outlet channel from the refrigerant reservoir.

37. The thermosiphon of paragraph 36, further including: a heating element; a sensor; and a controller configured to receive data from the sensor and to send control signals to the heating element in response to the received data.

38. The thermosiphon of paragraph 20, further including: a refrigerant reservoir; a channel between the refrigerant reservoir and at least one channel in the condenser region; a thermoelectric device operably attached to the refrigerant reservoir; a sensor; and a controller configured to receive data from the sensor and to send control signals to the thermoelectric device in response to the received data.

39. A temperature-regulated storage device, including: a thermal sink unit configured to contain phase-change material; a storage region including at least one wall; and a thermosiphon, including a condenser region, including a plurality of evenly spaced condenser channels with horizontally symmetrical bifurcated branches connected to an adiabatic channel, each of the plurality of condenser channels connected at a top position to an upper channel, an evaporator region, including a plurality of evaporator channels, wherein each of the plurality of evaporator channels has a flow channel formed in a serpentine channel pattern and each subunit of the serpentine channel pattern is attached to a vapor return channel at a top of the subunit, and wherein the evaporator region has at least one lowest position connected directly to a vapor return channel, and an adiabatic region including at least one adiabatic channel connecting the evaporator channels to the condenser channels, wherein the thermosiphon is fabricated within a planar structure with a substantially flat face and a rounded face, wherein the substantially flat face of the condenser region is positioned adjacent to the thermal sink unit and the flat face of the evaporator region is positioned adjacent to a wall of the storage region, and wherein the thermosiphon includes a predetermined load of refrigerant and a predetermined load of non-condensable gas.

40. The temperature-regulated storage device of paragraph 39, wherein the thermosiphon is substantially vertical when oriented for use within the temperature-regulated storage device.

41. The temperature-regulated storage device of paragraph 39, wherein the condenser region is positioned to be substantially above the evaporator region and the adiabatic region when the thermosiphon is oriented for use within the temperature-regulated storage device.

42. The temperature-regulated storage device of paragraph 39, wherein the condenser region includes: a fill port operably attached to the upper channel.

43. The temperature-regulated storage device of paragraph 39, wherein the condenser region includes: a gas-holding channel attached to the upper channel, the gas-holding channel including an interior space of a specific size to contain a volume of a non-condensable gas.

44. The temperature-regulated storage device of paragraph 39, wherein the substantially flat face of the condenser region includes a surface positioned adjacent to the expected water region of a water-ice mixture tank when the temperature-regulated storage device is in use.

45. The temperature-regulated storage device of paragraph 39, wherein the adiabatic region includes: multiple adiabatic channels positioned substantially in parallel between the evaporator channels and the condenser channels.

46. The temperature-regulated storage device of paragraph 39, wherein the at least one adiabatic channel of the adiabatic region includes: a two-phase channel.

47. The temperature-regulated storage device of paragraph 39, wherein the plurality of evaporator channels of the evaporator region includes: a plurality of two-phase channels.

48. The temperature-regulated storage device of paragraph 39, wherein the plurality of evaporator channels of the evaporator region are evenly spaced from each other along the main axis of the thermosiphon.

49. The temperature-regulated storage device of paragraph 39, wherein the plurality of evaporator channels of the evaporator region each have a minimum angle of flow greater than the expected maximum tilt of the temperature-regulated storage device when in use.

50. The temperature-regulated storage device of paragraph 39, wherein the plurality of evaporator channels of the evaporator region are expected to be substantially isothermal during use.

51. The temperature-regulated storage device of paragraph 39, wherein the thermosiphon is fabricated from a roll-bond material.

52. The temperature-regulated storage device of paragraph 39, wherein the thermosiphon is configured as at least two planar surfaces with an angle between the surfaces.

53. The temperature-regulated storage device of paragraph 39, wherein the thermosiphon includes an interior load of refrigerant and non-condensable gas relative to the heat load at use of the temperature-regulated storage device and the saturation pressure of the expected temperature range of use.

54. The temperature-regulated storage device of paragraph 39, wherein the thermosiphon includes an interior load of refrigerant and non-condensable gas sufficient to position an estimated position of a bulk of the non-condensable gas within the adiabatic region adjacent to the horizontally symmetrical bifurcated branches of the condenser region.

55. The temperature-regulated storage device of paragraph 39, further including: a refrigerant reservoir; an inlet channel to the refrigerant reservoir; and an outlet channel from the refrigerant reservoir.

56. The temperature-regulated storage device of paragraph 55, further including: a heating element; a sensor; and a controller configured to receive data from the sensor and to send control signals to the heating element in response to the received data.

57. The temperature-regulated storage device of paragraph 39, further including: a refrigerant reservoir; a channel between the refrigerant reservoir and at least one channel in the condenser region; a thermoelectric device operably attached to the refrigerant reservoir; a sensor; and a controller configured to receive data from the sensor and to send control signals to the thermoelectric device in response to the received data.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A thermosiphon for use within a temperature-regulated storage device, comprising:
a condenser region, including a plurality of evenly spaced condenser channels with horizontally symmetrical bifurcated branches connected to an adiabatic channel, each of the plurality of evenly spaced condenser channels connected at a top position to an upper channel;
an evaporator region, including a plurality of evaporator channels, wherein each of the plurality of evaporator channels has a flow channel formed in a serpentine channel pattern and each subunit of the serpentine channel pattern is attached to a vapor return channel at a top of the subunit, and wherein the evaporator region has at least one lowest position connected directly to the vapor return channel; and
an adiabatic region including at least one adiabatic channel connecting the plurality of evaporator channels and the plurality of evenly spaced condenser channels.

2. The thermosiphon of claim 1, wherein the condenser region comprises:
a gas-holding channel attached to the upper channel, the gas-holding channel including an interior space of a specific size to contain a volume of a non-condensable gas.

3. The thermosiphon of claim 1, wherein the condenser region includes a surface positioned adjacent to an expected water region of a water-ice mixture tank when the temperature-regulated storage device is in use.

4. The thermosiphon of claim 1, wherein the adiabatic region comprises:
multiple adiabatic channels positioned in parallel between the plurality of evaporator channels and the plurality of evenly spaced condenser channels.

5. The thermosiphon of claim 1, wherein the at least one adiabatic channel of the adiabatic region comprises:
a two-phase channel.

6. The thermosiphon of claim 1, wherein the plurality of evaporator channels of the evaporator region comprises:
a plurality of two-phase channels.

7. The thermosiphon of claim 1, wherein the plurality of evaporator channels of the evaporator region each have a minimum angle of flow greater than an expected maximum tilt of the temperature-regulated storage device when in use.

8. The thermosiphon of claim 1, wherein the plurality of evaporator channels of the evaporator region are expected to be isothermal during use.

9. The thermosiphon of claim 1, wherein the thermosiphon is fabricated from a roll-bond material.

10. The thermosiphon of claim 1, wherein the thermosiphon is configured as at least two planar surfaces with an angle between the surfaces.

11. The thermosiphon of claim 1, wherein the thermosiphon includes an interior load of refrigerant and non-condensable gas relative to the heat load at use of the temperature-regulated storage device and a saturation pressure of the expected temperature range of use.

12. The thermosiphon of claim 1, wherein the thermosiphon includes an interior load of refrigerant and non-condensable gas sufficient to position an estimated position of a bulk of the non-condensable gas within the adiabatic region adjacent to the horizontally symmetrical bifurcated branches of the condenser region.

13. The thermosiphon of claim 1, further comprising:
a refrigerant reservoir;
an inlet channel connected to the refrigerant reservoir; and
an outlet channel connected from the refrigerant reservoir.

14. The thermosiphon of claim 1, further comprising:
a refrigerant reservoir;
a channel between the refrigerant reservoir and at least one of the plurality of evenly spaced condenser channels in the condenser region;
a thermoelectric device operably attached to the refrigerant reservoir;
a sensor; and a controller configured to receive data from the sensor and to send control signals to the thermoelectric device in response to the received data.

15. A thermosiphon for use within a temperature-regulated storage device, comprising:
a condenser region, including a plurality of evenly spaced condenser channels with horizontally symmetrical bifurcated branches connected to an adiabatic channel, each of the plurality of evenly spaced condenser channels connected at a top position to an upper channel;
an evaporator region, including a plurality of evaporator channels, wherein each of the plurality of evaporator channels has a flow channel formed in a serpentine channel pattern and each subunit of the serpentine channel pattern is attached to one of a plurality of vapor return channels at a top of the subunit, and wherein the evaporator region has at least one lowest position connected directly to one of the plurality of vapor return channels; and
an adiabatic region including at least one adiabatic channel connecting the plurality of evaporator channels to the plurality of evenly spaced condenser channels,
wherein the thermosiphon is fabricated within a planar structure with a flat face and a rounded face, and wherein the thermosiphon includes a predetermined load of refrigerant and a predetermined load of non-condensable gas.

16. The thermosiphon of claim 15, wherein the condenser region comprises:
a gas-holding channel attached to the upper channel, the gas-holding channel including an interior space of a specific size to contain a volume of a non-condensable gas.

17. The thermosiphon of claim 15, wherein the adiabatic region comprises:
multiple adiabatic channels positioned in parallel between the plurality of evaporator channels and the plurality of evenly spaced condenser channels.

18. The thermosiphon of claim 15, wherein the at least one adiabatic channel of the adiabatic region comprises:
a two-phase channel.

19. The thermosiphon of claim 15, wherein the plurality of evaporator channels of the evaporator region comprises:
a plurality of two-phase channels.

20. The thermosiphon of claim 15, wherein the plurality of evaporator channels of the evaporator region each have a minimum angle of flow greater than an expected maximum tilt of the temperature-regulated storage device when in use.

21. The thermosiphon of claim 15, wherein the plurality of evaporator channels of the evaporator region are expected to be isothermal during use.

22. The thermosiphon of claim 15, wherein the thermosiphon is fabricated from a roll-bond material.

23. The thermosiphon of claim 15, wherein the thermosiphon is configured as at least two planar surfaces with an angle between the surfaces.

24. The thermosiphon of claim 15, wherein the thermosiphon includes an interior load of refrigerant and non-condensable gas relative to the heat load at use of the temperature-regulated storage device and a saturation pressure of an expected temperature range of use.

25. The thermosiphon of claim 15, wherein the thermosiphon includes an interior load of refrigerant and non-condensable gas sufficient to position an estimated position of a bulk of the non-condensable gas within the adiabatic region adjacent to the horizontally symmetrical bifurcated branches of the condenser region.

26. The thermosiphon of claim 15, further comprising:
a refrigerant reservoir;
an inlet channel connected to the refrigerant reservoir; and
an outlet channel connected from the refrigerant reservoir.

27. The thermosiphon of claim 15, further comprising:
a refrigerant reservoir;
a channel between the refrigerant reservoir and at least one of the plurality of evenly spaced condenser channels in the condenser region;
a thermoelectric device operably attached to the refrigerant reservoir;
a sensor; and
a controller configured to receive data from the sensor and to send control signals to the thermoelectric device in response to the received data.

28. A temperature-regulated storage device, comprising:
a thermal sink unit configured to contain phase-change material;
a storage region including at least one wall; and
a thermosiphon, including
a condenser region, including a plurality of evenly spaced condenser channels with horizontally symmetrical bifurcated branches connected to an adiabatic channel, each of the plurality of evenly spaced condenser channels connected at a top position to an upper channel,
an evaporator region, including a plurality of evaporator channels, wherein each of the plurality of evaporator channels has a flow channel formed in a serpentine channel pattern and each subunit of the serpentine channel pattern is attached to one of a plurality of vapor return channels at a top of the subunit, and wherein the evaporator region has at least one lowest position connected directly to one of the plurality of vapor return channels, and
an adiabatic region including at least one adiabatic channel connecting the plurality of evaporator channels to the plurality of evenly spaced condenser channels,
wherein the thermosiphon is fabricated within a planar structure with a flat face and a rounded face, wherein the flat face of the condenser region is positioned adjacent to the thermal sink unit and the flat face of the evaporator region is positioned adjacent to a wall of the storage region, and wherein the thermosiphon includes a predetermined load of refrigerant and a predetermined load of non-condensable gas.

29. The temperature-regulated storage device of claim 28, wherein the condenser region comprises:
a gas-holding channel attached to the upper channel, the gas-holding channel including an interior space of a specific size to contain a volume of a non-condensable gas.

30. The temperature-regulated storage device of claim 28, wherein the adiabatic region comprises:
multiple adiabatic channels positioned in parallel between the plurality of evaporator channels and the plurality of evenly spaced condenser channels.

31. The temperature-regulated storage device of claim 28, wherein the at least one adiabatic channel of the adiabatic region comprises:
a two-phase channel.

32. The temperature-regulated storage device of claim 28, wherein the plurality of evaporator channels of the evaporator region comprises:
a plurality of two-phase channels.

33. The temperature-regulated storage device of claim 28, wherein the plurality of evaporator channels of the evaporator region each have a minimum angle of flow greater than an expected maximum tilt of the temperature-regulated storage device when in use.

34. The temperature-regulated storage device of claim 28, wherein the plurality of evaporator channels of the evaporator region are expected to be substantially isothermal during use.

35. The temperature-regulated storage device of claim 28, wherein the thermosiphon is fabricated from a roll-bond material.

36. The temperature-regulated storage device of claim 28, wherein the thermosiphon is configured as at least two planar surfaces with an angle between the surfaces.

37. The temperature-regulated storage device of claim 28, wherein the thermosiphon includes an interior load of refrigerant and non-condensable gas relative to the heat load at use of the temperature-regulated storage device and a saturation pressure of an expected temperature range of use.

38. The temperature-regulated storage device of claim 28, wherein the thermosiphon includes an interior load of refrigerant and non-condensable gas sufficient to position an estimated position of a bulk of the non-condensable gas within the adiabatic region adjacent to the horizontally symmetrical bifurcated branches of the condenser region.

39. The temperature-regulated storage device of claim 28, further comprising:
    a refrigerant reservoir;
    an inlet channel connected to the refrigerant reservoir; and
    an outlet channel connected from the refrigerant reservoir.

40. The temperature-regulated storage device of claim 28, further comprising:
    a refrigerant reservoir;
    a channel between the refrigerant reservoir and at least one of the plurality of evenly spaced condenser channels in the condenser region of the thermosiphon;
    a thermoelectric device operably attached to the refrigerant reservoir;
    a sensor; and
    a controller configured to receive data from the sensor and to send control signals to the thermoelectric device in response to the received data.

* * * * *